(12) United States Patent
Jo et al.

(10) Patent No.: US 7,856,343 B2
(45) Date of Patent: Dec. 21, 2010

(54) SYSTEM AND METHOD FOR DESIGN EVALUATION OF MOBILE DEVICES USING VIRTUAL REALITY BASED PROTOTYPES

(75) Inventors: Dong-Sik Jo, Daejeon (KR); Ung-Yeon Yang, Daejeon (KR); WookHo Son, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 507 days.

(21) Appl. No.: 11/955,325

(22) Filed: Dec. 12, 2007

(65) Prior Publication Data

US 2009/0063104 A1 Mar. 5, 2009

(30) Foreign Application Priority Data

Aug. 29, 2007 (KR) .................. 10-2007-0086974

(51) Int. Cl.
*G06F 17/50* (2006.01)
*G06F 17/00* (2006.01)

(52) U.S. Cl. .......................................... 703/1; 345/418
(58) Field of Classification Search ................ 703/1; 716/4; 345/418, 622, 632
See application file for complete search history.

(56) References Cited

U.S. PATENT DOCUMENTS

2006/0073455 A1   4/2006   Buyl et al.

2008/0162262 A1 * 7/2008 Perkins ..................... 705/10

FOREIGN PATENT DOCUMENTS

| JP | 2003044544 A | 2/2003 |
| JP | 2003216657 A | 7/2003 |
| KR | 1020050009937 A | 1/2005 |

OTHER PUBLICATIONS

Virtual Reality Prototyping-a Framework for the Development of Electronics and Telecommunication Products, Mikko Kerttula, Marko Salmela, Marko Heikkinen VTT Eletronics & Infotech Research Centre at the University of Oulu, IEEE 1997.

* cited by examiner

*Primary Examiner*—Paul L Rodriguez
*Assistant Examiner*—Andre Pierre Louis

(57) ABSTRACT

A design evaluation system of mobile devices using virtual reality based prototypes is proposed. The system includes: a storage unit for storing therein 3-dimensional computer-aided design data of a virtual mobile device; a component selection unit for performing a selection among the 3-dimensional computer-aided design data stored in the storage unit and fetching the selected data therefrom; a design parameter setting unit for setting design parameters of the virtual mobile device; a 3-dimensional model visualization unit for visualizing the virtual mobile device to a 3-dimensional model by using the design parameters and the fetched data; a product motion control unit for simulating motions and functions of the visualized virtual mobile device; and a design preference display unit for displaying user design preference for the visualized and simulated virtual mobile device.

14 Claims, 3 Drawing Sheets

SYSTEM AND METHOD FOR DESIGN EVALUATION OF MOBILE DEVICES USING VIRTUAL REALITY BASED PROTOTYPES

FIELD OF THE INVENTION

The present invention relates to a system and method for design evaluation of mobile devices using virtual reality prototypes; and, more particularly, to a system and method capable of measuring and predicting design preference in real time, by visualizing a virtual mobile device looking similar to a real mobile device via high-quality visualization and representing user interaction such as motions and functions of the mobile devices under a virtual environment, to perform design evaluation of the mobile device which is a one-handed small-sized information home appliance such as a cellular or PCS (Personal Communications Service) phone, an UMPC (Ultra-Mobile PC), a PDA (Personal Digital Assistants), a PMP (Portable Multimedia Player), and the like.

This work was supported by the IT R&D program of MIC/IITA. [2005-S-604-02, Realistic Virtual Engineering Technology Development]

BACKGROUND OF THE INVENTION

Building a prototype in a product design procedure is essential to design and usability evaluation. However, most processes in building the prototype are performed manually, thereby lowering reusability of the prototype and raising time and cost for building the prototype. Further, in a conventional evaluation method based on user design preference, errors in the product are collected via beta tests or interviews just before a release of the product to a market, and thus cost for correcting the errors increases significantly.

In recent, a virtual reality system for building a prototype of a product by allowing a quick and easy exchange of components and providing natural user interaction is proposed. Accordingly, a system capable of predicting user design preference for a mobile device before a release of a product by using a virtual reality based prototype becomes to be needed.

In relation to a conventional technology for evaluating a design of a mobile device using a virtual reality based prototype, U.S. patent Laid-Open application Ser. No. 10/954,448 entitled "VIRTUAL REALITY BASED PROTOTYPING SYSTEM FOR MEDICAL DEVICES" proposes a virtual reality based prototype capable of changing design parameters while operating a virtual model of a medical device and simulating a medical procedure relating to the virtual model. However, it does not disclose a design parameter classification method for design evaluation and a realistic visualization method.

Further, the first virtual reality based prototyping methodology for electronics and telecommunication products developed by researchers in the university of Oulu, Finland and VTT Electronics ("Virtual Reality Prototyping—a Framework for the Development of Electronics and Telecommunication Products", in Proc. of 8th IEEE International Workshop on Rapid System Prototyping, 1997) does not provide a simulation on motions and functions of the product as well as a virtual mobile device looking similar to a real product, thus resulting in insufficient reality to design evaluation using virtual reality technologies.

As described above, technologies for evaluating a design of a mobile device using conventional prototyping have drawbacks in that it cannot provide a realistic image and natural user interaction. That is, it cannot provide a high-quality image looking similar to a real product and a simulation on motions and functions of the product for design evaluation by using virtual reality technologies.

SUMMARY OF THE INVENTION

In view of the above, the present invention provides a system and method, relating to design evaluation of a mobile device, for visualizing a virtual mobile device to a high-quality 3-dimensional image and representing user interaction of the virtual mobile device such as motions and functions thereof.

Further, the present invention provides a system and method for design evaluation of a mobile device using a virtual reality based prototype capable of visualizing 3-dimensional CAD (Computer-Aided Design) data built in a design procedure to a high-quality virtual model and performing realistic simulations on operation of the mobile device, to thereby verify a design of the mobile device at an early stage of its design procedure, i.e., before a release of the mobile device which is a one-handed small-sized home appliance such as a cellular or PCS phone, UMPC, PDA, PMP, and the like.

Furthermore, the present invention provides a method for classifying and selecting design parameters of a mobile device to be released, and deriving a preference prediction equation via a preference prediction experiment of a real product on test subjects, thereby measuring user design preference according to the design parameters of a virtual reality based prototype of the mobile device.

In accordance with a first aspect of the invention, there is provided a design evaluation system of mobile devices using virtual reality based prototypes, including:

a storage unit for storing therein 3-dimensional computer-aided design data of a virtual mobile device;

a component selection unit for performing a selection among the 3-dimensional computer-aided design data stored in the storage unit and fetching the selected data therefrom;

a design parameter setting unit for setting design parameters of the virtual mobile device;

a 3-dimensional model visualization unit for visualizing the virtual mobile device to a 3-dimensional model by using the design parameters and the fetched data;

a product motion control unit for simulating motions and functions of the visualized virtual mobile device; and a design preference display unit for displaying user design preference for the visualized and simulated virtual mobile device.

In accordance with a second aspect of the invention, there is provided a design evaluation system of mobile devices using virtual reality based prototypes, including:

a data process module for managing mobile device data, which include data on a type and components of a virtual mobile device, and performing selection among the mobile device data;

an image visualization module for visualizing the virtual mobile device by using the selected mobile device data and representing user interaction to the virtual mobile device; and a design preference prediction module for performing a prediction of design preference for the visualized virtual mobile device.

In accordance with a third aspect of the invention, there is provided a design evaluation method of mobile devices using virtual reality based prototypes, including:

managing mobile device data including data on a type and components of a virtual mobile device and performing selection among the mobile device data;

visualizing the virtual mobile device by using the selected mobile device data and representing user interaction to the virtual mobile device; and performing a prediction of design preference for the visualized virtual mobile device.

In accordance with embodiments of the present invention, a mobile device is projected onto a high-quality 3-dimensional model in which design parameters such as colors, materials, shapes, and the like can be quickly and easily set and changed by a user. Also, motions of the model driven by user interaction are represented naturally. Hence, affective engineering based design preference can be measured and evaluated in real time.

Further, in accordance with the embodiments of the present invention, design verification is carried out at an early stage of a design procedure, i.e., before a release of a product, to achieve a success of a differentiated new product of a mobile device having a short product life cycle in a market. Accordingly, it is possible to reduce costs for developing and manufacturing the product and time for selecting a product model. Also, it is possible to present a concrete product design guide line needed for improving affective level of the product by providing affective satisfaction level and user design preference for the product designed by a designer as objective numerical values.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Hereinafter, a system and method for design evaluation of mobile devices using virtual reality based prototypes in accordance with embodiments of the present invention will be described in detail with reference to the accompanying drawings.

Figure 1:
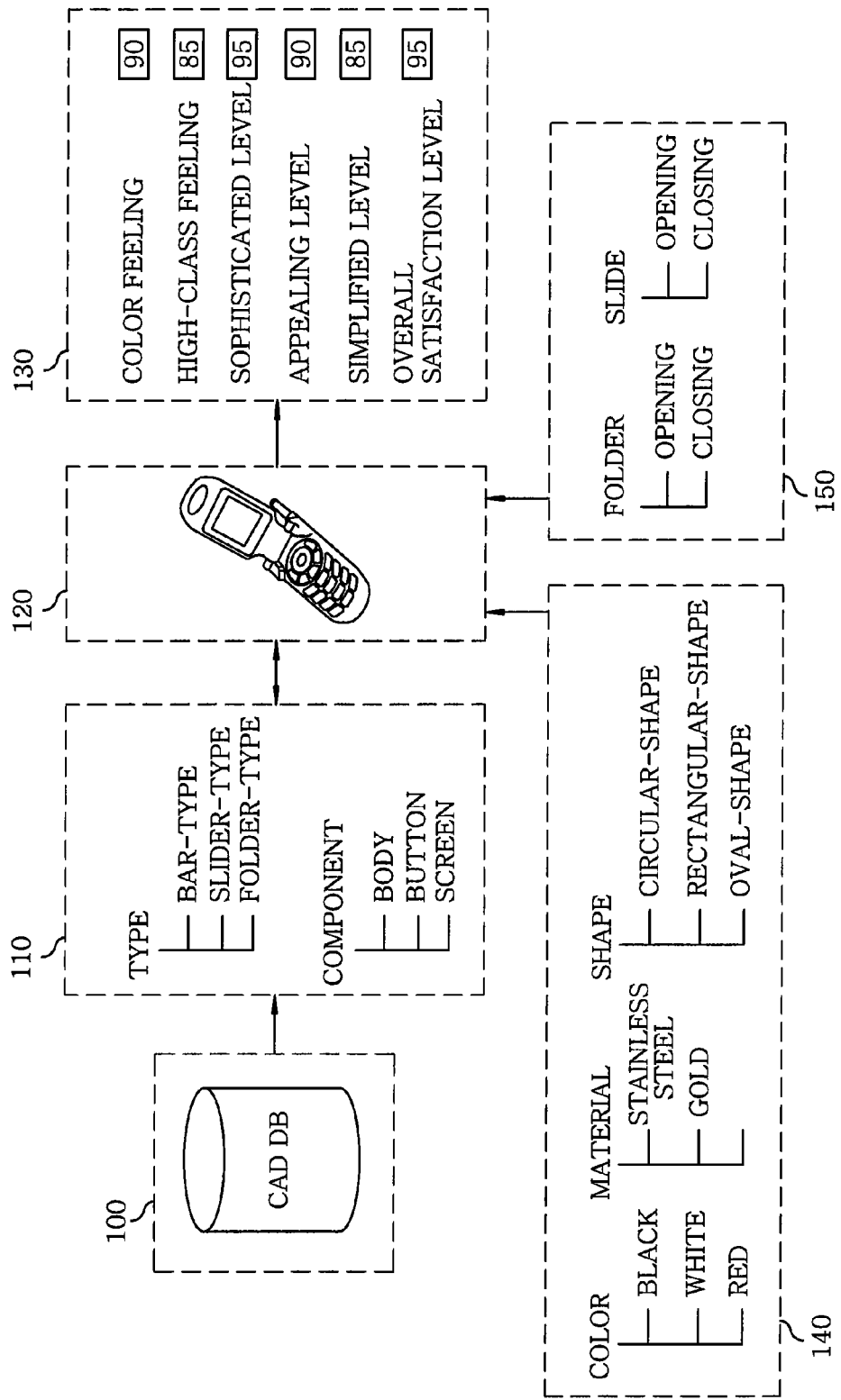
FIG. 1 illustrates an overall configuration of a design evaluation system of mobile devices using virtual reality based prototypes in accordance with an embodiment of the present invention.

FIG. 1 illustrates an overall configuration of a design evaluation system of mobile devices, e.g., a cellular or PCS phone, using virtual reality based prototypes in accordance with an embodiment of the present invention.

Referring to FIG. 1, a design evaluation system of mobile devices includes a CAD (Computer-Aided Design) data storage unit 100; a component selection unit 110; a 3D (3-dimensional) model visualization unit 120; a design preference display unit 130; a design parameter setting unit 140; and a product motion control unit 150.

The CAD data storage unit 100, which may be comprised of CAD database, stores 3-dimensional CAD data of a virtual mobile device built in a design procedure in a database to verify a design of a product at an early stage of its design procedure, and performs access management to the data stored in the database.

The component selection unit 110 selects a type and components of the virtual mobile device, and fetches data on the selected type and components from the CAD model storage unit 100. Mobile device products released in a market are classified into a bar-type, a slider-type, a folder-type, and the like, and each of the products has components such as a body, buttons, a screen, and the like. The component selection unit 110 performs a selection among the types and the components.

The 3D model visualization unit 120 visualizes the virtual mobile device to a 3-dimensional model via graphic processes to give the 3-dimensional model a similar look to a real product. The 3-dimensional model visualization unit 120 receives from the design parameter setting unit 140 design parameters, such as colors, materials, shapes, and the like of the virtual mobile device, and reflects them on the type and components selected by the component selection unit 110. The 3D model visualization unit 120 receives motion information of the virtual mobile device from the product motion control unit 150, and according to this, continuously adjusts and visualizes the 3-dimensional model in real time. The 3D model visualization unit 120 provides data on the visualized virtual mobile device to the design preference display unit 130.

The design preference display unit 130 displays user design preference for the virtual mobile device visualized by the 3D model visualization unit 120. The user design preference includes a color feeling, a high-class feeling, a sophisticated level, an appealing level, a simplified level, an overall satisfaction level, and the like. Here, the color feeling indicates how much a user likes colors used in a product; the high-class feeling indicates how much the product looks like a high-class one considering its quality and price; the sophisticated level indicates how much the product looks sophisticated; the appealing level indicates how much the product appeals to the user; the simplified level indicates how much the product is simplified or complicated; and the overall satisfaction level indicates how much the product satisfies the user.

The design parameter setting unit 140 sets the design parameters such as colors, materials, shapes, and the like of the virtual mobile device, and provides them to the 3D model visualization unit 120, thereby allowing the 3D model visualization unit 120 to reflect the set design parameters to the virtual mobile device. For example, among the design parameters, the colors may be black, white, red, and the like; the materials may be stainless steel, gold, and the like; and the shapes may be a circular-shape, a rectangular-shape, an oval-shape, and the like. These design parameters of the mobile device need to be classified by considering how much they affect the affective satisfaction; how much detailed items they are; and how much they are differentiated according to product types.

The product motion control unit 150 provides the motion information of the virtual mobile device to the 3D model visualization unit 120. The motion information of the virtual mobile device represents user interaction which can be made on a real mobile device, for example, opening or closing a folder of a folder-type mobile device.

Figure 2:
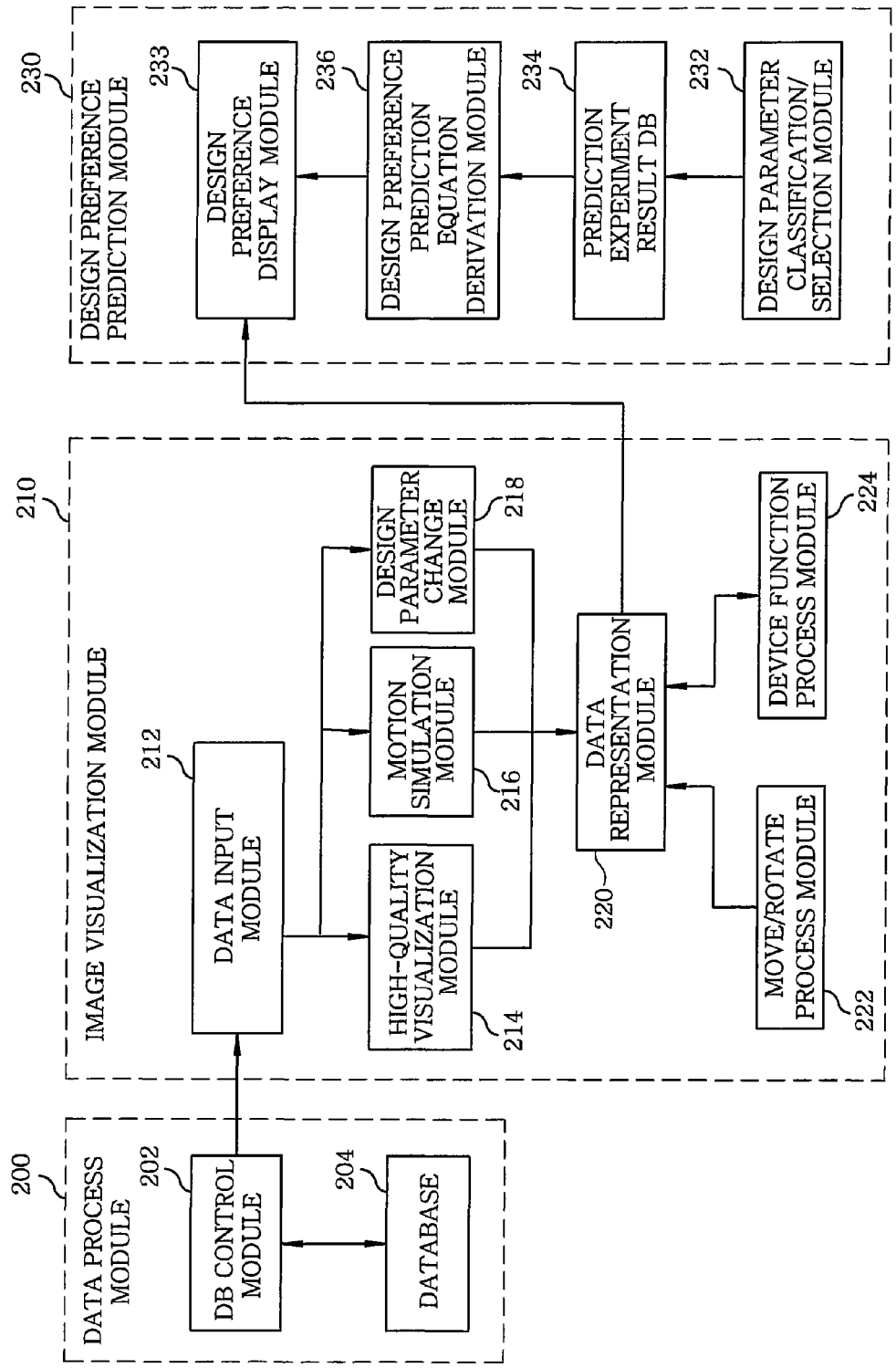
FIG. 2 illustrates a structural block diagram of the design evaluation system of mobile devices using virtual reality based prototypes in accordance with another embodiment of the present invention.

FIG. 2 illustrates a structural block diagram of a design evaluation system of mobile devices using virtual reality based prototypes in accordance with another embodiment of the present invention.

Referring to FIG. 2, a design evaluation system of mobile devices using virtual reality based prototypes includes a data process module 200; an image visualization module 210; and a design preference prediction module 230. In the system, a virtual mobile device is visualized to a virtual reality based prototype image using mobile device data therefore, which includes data on a type and components of the virtual mobile device, and design preference for the visualized virtual mobile device is predicted.

The data process module 200 manages the mobile device data. Also, the data process module 200 sends selected mobile device data to the image visualization module 210. To be specific, the data process module 200 has a database (DB) 204 for storing therein the mobile device data; and a DB control module 202 for controlling the database 204 to store the mobile device data therein, modifying and deleting the mobile device data stored in the database 204, and performing selection among the mobile device data.

The image visualization module 210 visualizes the virtual mobile device to a high-quality 3-dimensional image and represents user interaction to the virtual mobile device using the 3-dimensional image. The image visualization module 210 has a data input module 212; a high-quality visualization module 214; a motion simulation module 216; a design parameter change module 218; a data representation module 220; a move/rotate process module 222; and a device function process module 224.

Operation of each component of the image visualization module 210 will be described below.

The data input module 212 receives the mobile device data from the DB control module 202 in the data process module 200, and provides the mobile device data to the high-quality visualization module 214, the motion simulation module 216, and the design parameter change module 218.

The high-quality visualization module 214 performs a process for visualizing the virtual mobile device to a high-quality 3-dimensional image which looks like a real picture in real time. For this purpose, special lighting effects such as a refraction effect, a reflection effect, a Fresnel effect, a bump effect, and the like are added to a body, buttons, material, a display panel, and the like of the virtual mobile device. In general, the high-quality image can be generated quickly and easily in real time by using HLSL (High-Level Shading Language) which is a GPU (Graphics Processing Unit) programming language. The motion simulation module 216 performs a process for represent motions of the components of the virtual mobile device using the 3-dimensional image. The motions include, for example, rotating a camera as well as basic motions such as opening/closing a folder, sliding a slide, and the like. The design parameter change module 218 performs a process for changing colors, materials, shapes, and the like of the virtual mobile device.

The move/rotate process module 222 performs a process for moving a position of the virtual mobile device in the x, y, and z directions and rotating the virtual mobile device with respect to the x, y, and z axis in a virtual environment, thus allowing the user to see details of the virtual mobile device. The device function process module 224 performs a process for representing operation of embedded software of the virtual mobile device using the 3-dimentional image. An animation process operation between the display panel and the buttons in response to a user input can be an example of the operation of the embedded software.

The data representation module 220 receives data processed through the use of the high-quality visualization module 214, the motion simulation module 216, the design parameter change module 218, the move/rotate process module 222, and the device function process module 224. The data representation module 220 performs high-quality visualization and user interaction representation by using the received data, and then provides data on the virtual mobile device to the design preference prediction module 230.

The design preference prediction module 230 performs a prediction of design preference by using an experimental methodology for scoring each evaluation item of design preference, e.g., a color feeling, a high-class feeling, a sophisticated level, an appealing level, a simplified level, an overall satisfaction level, and the like.

The design preference prediction module 230 includes a design parameter classification/selection module 232; a prediction experiment result DB 234; a design preference prediction equation derivation module 236; and a design preference display module 238.

The design parameter classification/selection module 232 classifies the design parameters according to a type of the component (e.g., buttons, a screen, a body, a camera, a speaker, and the like) and design properties of the component (e.g., a shape, a size, an angle, colors, and the like), and then performs a selection among the design parameters with how much they affect on the affective satisfaction, how much they are sophisticated, how much their characteristics are differentiated, and the like taken into consideration.

A prediction experiment is performed on test subjects using a real mobile device to which the selected design parameters are reflected, and results of the prediction experiment are stored in the prediction experiment result DB 234.

The design preference prediction equation derivation module 236 derives a design preference prediction equation Y for each evaluation item of the design preference from the results of the prediction experiment stored in the prediction experiment result DB 234 by performing a multiple regression analysis thereon.

The design preference prediction equation Y with n design parameters taken into consideration, each of the design parameters being a specific shape, size, angle or color of a component or the like, is as follows:

$$Y = \sum_{k=1}^{n} w(x_k) \qquad \text{Equation 1}$$

wherein, $w(x_k)$ represents a weight function, depending on the evaluation item of the design preference (e.g., the color feeling, the high-class feeling, the sophisticated level, the appealing level, the simplified level, the overall satisfaction level, and the like), with an input of a design parameter $x_k$.

By using the design preference prediction equation Y as in Equation 1, the design preference display module 238 calculates and displays a numerical value for each evaluation item as design preference for the virtual mobile device visualized in the virtual environment whenever the design parameters of the virtual mobile device are changed.

Figure 3:
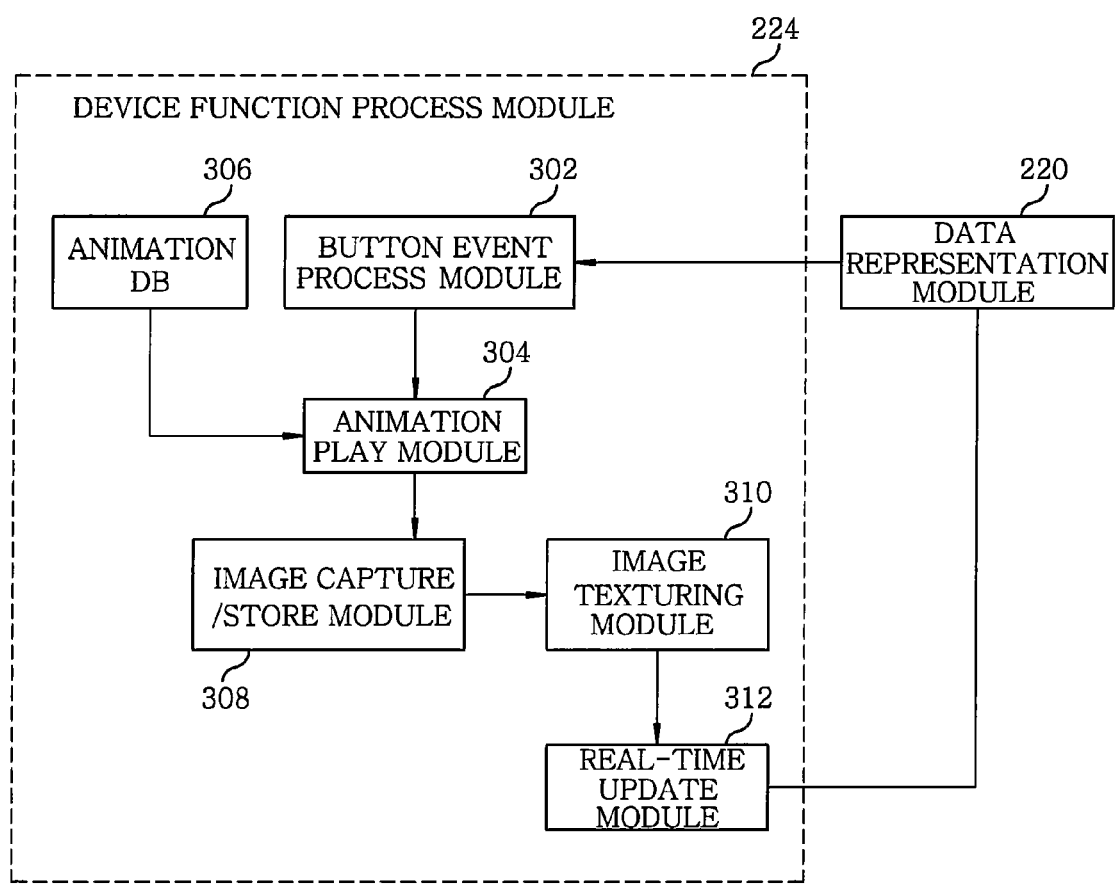
FIG. 3 illustrates a structural block diagram of a device function process module in an image visualization module of FIG. 2.

FIG. 3 illustrates a structural block diagram of a device function process module in an image visualization module of FIG. 2.

Referring to FIG. 3, the device function process module 224 performs to represent functions of the virtual mobile device and operation of embedded software driven by user interaction in the image visualization module 210 of the virtual reality based prototype system, the system operating similarly to a real product in order for design evaluation of a mobile device.

The device function process module 224 can be generally used as a module for integrating and operating visualization results via different graphic softwares which do not interoperate with each other in a single graphic space. In this embodiment, the device function process module 224 interoperates with the data representation module 220 to play 2-dimensional animation, which is originally played in a real mobile device, on a display of the virtual mobile device when the user manipulates buttons of the virtual mobile device. For this purpose, since a module for processing animation in a virtual environment is a 3-dimensional module and a module for processing animation in the real mobile device is a 2-dimensional module, the device function process module 224 is required to have a function for converting 2D animation data to 3D animation data.

The device function process module 224 includes a button event process module 302; an animation play module 304; an animation DB 306; an image capture/store module 308; an image texturing module 310; and a real-time update module 312.

The button event process module 302 receives a signal from the data representation module 220 when the user manipulates buttons of the virtual mobile device, and then sends button information according to the received signal to the animation play module 304.

The animation DB 306 stores therein 2-dimensional animation data to be played by the embedded software of the real mobile device. The animation play module 304 selects and plays a 2-dimensional animation from the animation DB 306 corresponding to the button information received from the button event process module 302.

The image capture/store module 308 captures a scene image of the playing animation and stores the captured image in a bitmap format.

The image texturing module 310 performs on the image stored by the image capture/store module 308 an image texturing process, thereby giving more realistic look to the image.

The real-time update module 312 provides the textured image to the data representation module 220 to display the image on the display of the virtual mobile device as a 3-dimensional image whenever the user manipulates the buttons of the virtual mobile device.

As described above, the system and method of the present invention visualizes 3-dimensional CAD data built in a design procedure to a high-quality virtual model and performs realistic simulations on operation of a mobile device, thus verifying a design of the product at an early stage of its design procedure, i.e., before a release of a mobile device which is a one-handed small-sized home appliance such as a cellular or PCS phone, UMPC, PDA, PMP, and the like.

While the invention has been shown and described with respect to the embodiments, it will be understood by those skilled in the art that various changes and modification may be made without departing from the scope of the invention as defined in the following claims.

What is claimed is:

1. A design evaluation system of mobile devices using virtual reality based prototypes, comprising:
    a data process module for managing mobile device data, which include data on a type and components of a virtual mobile device, and performing selection among the mobile device data;
    an image visualization module for visualizing the virtual mobile device by using the selected mobile device data and representing user interaction to the virtual mobile device; and
    a design preference prediction module for performing a prediction of design preference for the visualized virtual mobile device,
    wherein the design preference prediction module includes:
        a design parameter classification/selection module for classifying design parameters of a real mobile device and performing a selection among the classified design parameters;
        a prediction experiment result database for storing therein results of a prediction experiment which has been performed on test subjects using the real mobile device to which the selected design parameters are reflected;
        a design preference prediction equation derivation module for deriving a design preference prediction equation Y for each evaluation item of the design preference from the results of the prediction experiment stored in the prediction experiment result database by performing a multiple regression analysis; and
        a design preference display module for calculating the design preference for the virtual mobile device by using the design preference prediction equations and displaying the design preference.

2. The system of claim 1, wherein the data process module includes:
    a database for storing therein the mobile device data; and
    a database control module for storing the mobile device data in the database, modifying and deleting the mobile device data stored in the database, and performing the selection among the mobile device data.

3. The system of claim 1, wherein the image visualization module includes:
    a data input module for receiving the selected mobile device data from the data process module;
    a high-quality visualization module for performing a process for visualizing the virtual mobile device to a 3-dimensional image and adding special lighting effects to the 3-dimensional image;
    a motion simulation module for performing a process for representing motions of the components of the virtual mobile device using the 3-dimensional image;
    a design parameter change module for performing a process for changing design parameters of the virtual mobile device;
    a move/rotate process module for performing a process for moving a position of the virtual mobile device in the x, y, and z directions and rotating the virtual mobile device with respect to the x, y, and z axis; and
    a device function process module for performing a process for representing operation of embedded software of the virtual mobile device using the 3-dimentional image; and
    a data representation module for receiving data from the high-quality visualization module, the motion simulation module, the design parameter change module, the move/rotate process module, and the device function process module to visualize the virtual mobile device to the 3-dimensional image and represent the motions and operation of the virtual mobile device using the 3-dimensional image.

4. The system of claim 3, wherein the device function process module includes:
    a button event process module for receiving a signal from the data representation module when a user manipulates buttons of the virtual mobile device and generating button information according to the received signal;

an animation database for storing therein 2-dimensional animations which are played in a real mobile device;

an animation play module for playing a 2-dimensional animation which is stored in the animation database and selected according to the button information received from the button event process module;

an image capture/store module for capturing a scene image of the 2-dimentional animation played by the animation play module and storing the scene image in a bitmap format;

an image texturing module for performing an image texturing process on the image stored by the image capture/store module; and a real-time update module for providing the textured image to the data representation module to display the image on a display of the virtual mobile device as a 3-dimensional image whenever the user manipulates the buttons of the virtual mobile device.

5. The system of claim 1, wherein the design parameter classification/selection module classifies the design parameters according to types and design properties of the components.

6. The system of claim 1, wherein the design preference prediction equation Y with n design parameters taken into consideration is represented as:

$$Y = \sum_{k=1}^{n} w(x_k)$$

wherein, $w(x_k)$ represents a weight function, depending on the evaluation item of the design preference, with an input of a design parameter $x_k$.

7. The system of claim 1, wherein the design preference display module displays numerical values obtained by the design preference equations as the design preference for the virtual mobile device whenever the design parameters of the virtual mobile device are changed.

8. A design evaluation method of mobile devices using virtual reality based prototypes comprising:

managing mobile device data including data on a type and components of a virtual mobile device and performing selection among the mobile device data;

visualizing the virtual mobile device by using the selected mobile device data and representing user interaction to the virtual mobile device; and performing a prediction of design preference for the visualized virtual mobile device, wherein performing a prediction of the design preference for the visualized virtual mobile device includes:

classifying design parameters of a real mobile device and performing a selection among the classified design parameters;

performing a prediction experiment on test subjects using the real mobile device to which the selected design parameters are reflected;

deriving a design preference prediction equation Y for each evaluation item of the design preference from the results of the prediction experiment by performing a multiple regression analysis; and calculating the design preference for the virtual mobile device by using the design preference prediction equations and displaying the design preference.

9. The method of claim 8, wherein managing the mobile device data includes storing the mobile device data in a database, and modifying and deleting the mobile device data stored in the database.

10. The method of claim 8, wherein visualizing the virtual mobile device and representing user interaction to the virtual mobile device includes:

visualizing the virtual mobile device to a 3-dimensional image and adding special lighting effects to the 3-dimensional image;

representing motions of the components of the virtual mobile device using the 3-dimensional image;

changing design parameters of the virtual mobile device;

moving a position of the virtual mobile device in the x, y, and z directions and rotating the virtual mobile device with respect to the x, y, and z axis; and representing operation of embedded software of the virtual mobile device using the 3-dimentional image.

11. The method of claim 10, wherein performing the process for representing the operation of the embedded software of the virtual mobile device includes:

generating button information when a user manipulates buttons of the virtual mobile device;

playing a 2-dimensional animation according to the button information;

capturing a scene image of the playing 2-dimentional animation and storing the scene image in a bitmap format;

performing an image texturing process on the stored image; and displaying the textured image on a display of the virtual mobile device as a 3-dimensional image.

12. The method of claim 8, wherein the design parameters of the real mobile device are classified according to types and design properties of the components.

13. The method of claim 8, wherein the design preference prediction equation Y with n design parameters taken into consideration is represented as:

$$Y = \sum_{k=1}^{n} w(x_k)$$

wherein, $w(x_k)$ represents a weight function, depending on the evaluation item of the design preference, with an input of a design parameter $x_k$.

14. The system of claim 8, wherein numerical values obtained by the design preference equations are displayed as the design preference for the virtual mobile device whenever the design parameters of the virtual mobile device are changed.

* * * * *